னited States Patent　[11] 3,533,509

| [72] | Inventor | Walter J. Kudlaty |
| | | Elmhurst, Illinois |
| [21] | Appl. No. | 777,750 |
| [22] | Filed | Nov. 21, 1968 |
| [45] | Patented | Oct. 13, 1970 |
| [73] | Assignee | Marvel Engineering Company |
| | | Chicago, Illinois |
| | | a corporation of Delaware |

[54] UNIVERSAL FILTER HOUSING HEAD CONSTRUCTION
1 Claim, 8 Drawing Figs.

| [52] | U.S. Cl. | 210/240, 137/269 |
| [51] | Int. Cl. | B01d 23/20 |
| [50] | Field of Search | 210/239, 240, 447, 442, 473; 137/269 |

[56] References Cited
UNITED STATES PATENTS
1,679,033　7/1928　Holmes .................. 210/447UX
3,179,253　4/1965　McNeal .................. 210/447X OTHER REFERENCES
Hoferer, German Application 1,134,659, printed Aug. 16, 1962, KL 12 & 13, Class 210/240.

*Primary Examiner*—Samih N. Zaharna
*Assistant Examiner*—T.A. Granger
*Attorney*—Parker, Carter and Markey ABSTRACT: A filter housing head construction in which a housing has inlet and outlet openings of maximum diameter for the housing size involved and defined by smooth, flat inner walls, threaded sockets being formed in the housing adjacent the openings and a plurality of connection blocks or plates having selectable, formed connection configurations of varying types and diameters for attachment to the sockets, the head having an inner web wall conformation with knockout segments for alternate use with or without bypass valve elements.

Patented Oct. 13, 1970

3,533,509

INVENTOR.
Walter J. Kudlaty
BY Parker, Carter & Markey
Attorneys.

Patented Oct. 13, 1970 3,533,509

INVENTOR.
Walter J. Kudlaty
BY Parker, Carter & Markey
Attorneys.

UNIVERSAL FILTER HOUSING HEAD CONSTRUCTION

SUMMARY OF THE INVENTION

A universal filter housing head is formed with external, relatively flat pad areas. Inlet and outlet openings are formed in said areas with smooth inner surfaces having no threads, flanges or other attaching conformations and with diameters as large as the largest conduit to be used with such head. Fitting or connection blocks or plates having formed axial bores therein of diameters equal to or less than that of said openings are provided for attachment to threaded sockets in the head adjacent each opening, the bores aligning axially with said openings. The fitting plates are selectable to form connecting means for tubing having a variety of diameters, threaded conformations, flanges and the like. Internally, the heads are provided with a wall having removable segments for selection between a head with or without a bypass capability, the segments when removed creating a bypass passage and valve mounting means.

This invention relates to the field of filters and has particular relation to the provision of a universal filter housing head construction.

One purpose of the invention is to provide for substantial reduction in the cost of manufacturing, storing and inventorying filter housing heads.

Another purpose is to provide a universal filter housing head usable with a wide variety of connecting conduits or tubing.

Another purpose is to provide a filter housing head usable with or without bypass valve elements.

Another purpose is to provide a filter housing head having improved cold or start-up characteristics.

Another purpose is to provide a filter housing head having improved bypass characteristics.

Another purpose is to provide fitting plates or blocks selectively positionable on a universal filter housing head and having means selectively positionable for attachment to varying structures.

Other purposes will appear from time to time during the course of the ensuing specification and claims.

BRIEF DESCRIPTION OF THE DISCLOSURE

The invention is illustrated more or less diagrammatically in the accompanying drawings wherein.

Like parts are indicated by like numerals throughout the specification and drawings.

DESCRIPTION OF THE PREFERRED EMBODIMENT

Figure 1:
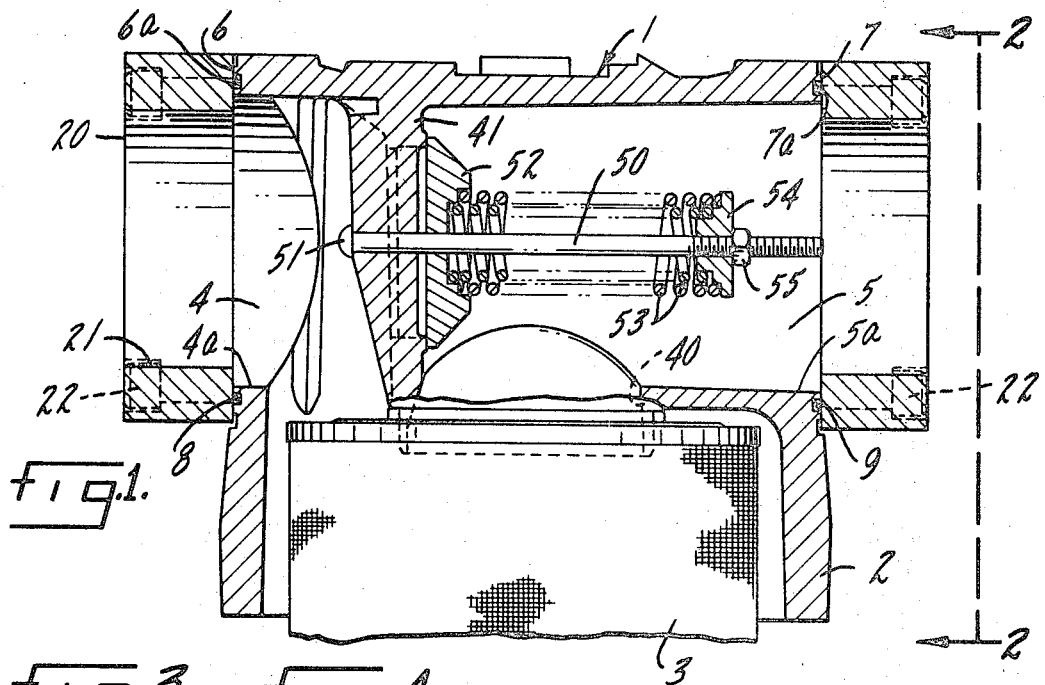
FIG. 1 is a side elevation in partial cross section of the invention in one configuration.

Referring now to the drawings, a filter housing head 1 has a lower circumferential portion 2, it being understood that a suitable, generally cup-shaped housing part (not shown) is secured in known manner to the portion 2 to form a housing for a filtering member such as that shown partially at 3.

The head 1 has formed therein an inlet opening 4 and an outlet opening 5. It will be observed that openings 4 and 5 are of equal diameter and that the inner wall surfaces 4a and 5a, defining respectively the openings 4 and 5, are smooth and unbroken by threads, flanges, recesses or similar attaching conformations.

The head 1 has external, flat, padlike surfaces or areas 6 and 7 surrounding, respectively, the openings 4 and 5. Circular recesses or grooves 6a and 7a are formed respectively in pad surfaces 6 and 7 and surround the openings 4 and 5 for reception of respective seals 8 and 9. Threaded sockets 10 are positioned at 90° positions from each other and radially about each of the openings 4,5.

Pads 6,7 are formed and positioned to receive a variety of attaching or connection-forming members, four of which are illustrated in FIGS. 3—6, inclusive. As shown in FIG. 1, the connection-forming plate or block members are indicated at 20. Each of the members 20 includes a set of apertures positioned at 90° from each other and radially of a central bore 21 extending axially through the member 20. As indicated at 22, suitable fasteners, such as the threaded bolts shown, extend through the apertures in the members 20 and threadably engage the threaded sockets 10 to secure the members 20 to the pads 6 and 7 and thus to head 1.

Figure 3:
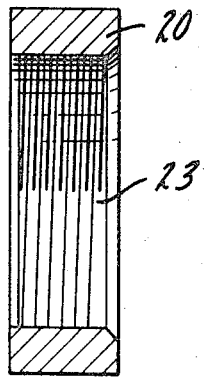
FIGS. 3, 4, 5 and 6 illustrate varying forms of fitting plates in cross section.
Figure 4:
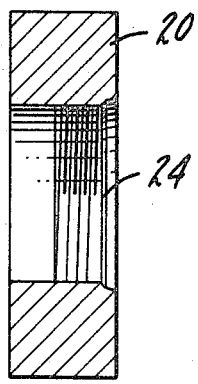
Figure 5:
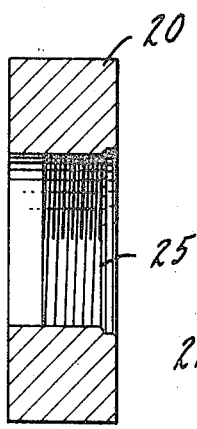
Figure 6:
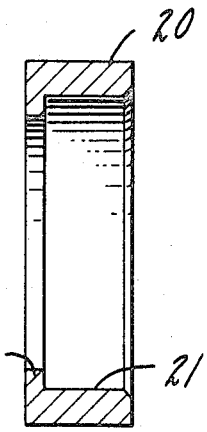

The members 20 may have a variety of attaching conformations associated with the bores 21. Referring, for examples, to FIGS. 3—6, the bore 21 of FIG. 3 illustrates a conversion or connection-forming configuration incorporating NPTF threads, as indicated at 23. FIG. 4 illustrates the member 20 having in its bore 21 a set of SAE standard threads as indicated at 24. FIG. 5 illustrates a member 20 having AND 10050 threads 25 and FIG. 6 illustrates a member 20 in which the bore 21 has an inwardly extending annular end flange 21a formed therein for connection with welded line connections and with tubes and pipes having cooperating conformations, such as flanges and the like.

It will be observed that the diameters of the bores 21 may be varied. For example, the diameter of the bores 21 shown in FIG. 1 is slightly less than the diameter of the openings 4,5 of the head 1. The diameters of the bore 21 shown in FIGS. 3 and 6 are substantially closer to the diameters of the openings 4,5, while the diameters of the bores shown in FIGS. 4 and 5 are substantially less than the diameters of the openings 4,5.

Formed in each of the block members 20 are threaded sockets 30 having their open ends facing outwardly of the block members 20 when the same are secured to the head 1. The threaded holes or sockets 30 are provided for attachment of suitable elements such as supporting brackets, pipe supports and the like and, as shown, they correspond with bolt locations used in SAE four-bolt flanges.

Figure 7:
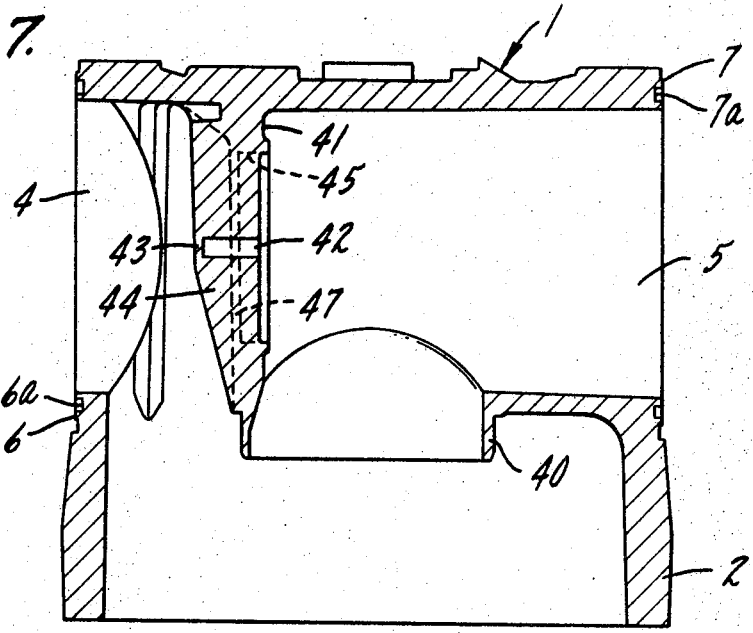
FIG. 7 is a cross section illustrating the head of the invention in another configuration.
Figure 8:
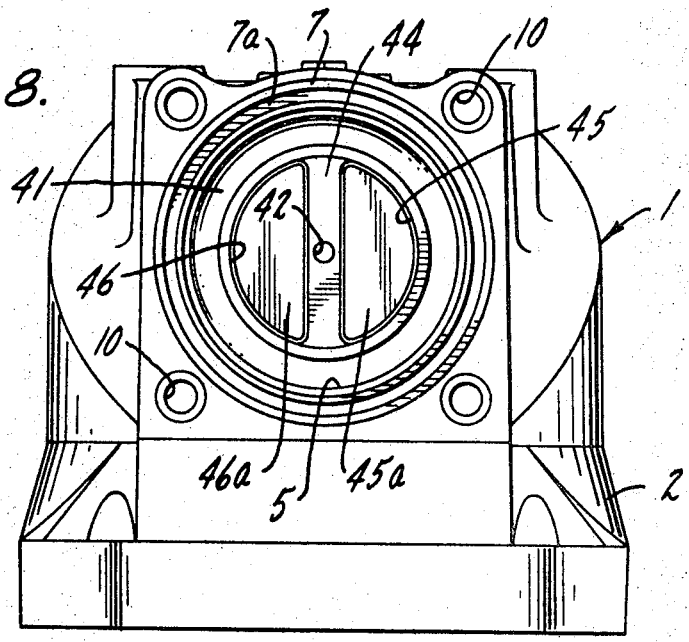
FIG. 8 is an end view of the structure illustrated in FIG. 7.

Referring now to FIGS. 7 and 8, it will be observed that the opening 5 in housing 1 extends laterally thereof a substantial distance toward the opening 4 and that the opening 5 communicates with a downwardly disposed, as the parts are shown, sleeve 40. As may be best seen in FIG. 1, the sleeve 40 sealingly receives the filter element 3.

Intermediate the openings 4 and 5 and precluding communication therebetween, except through the sleeve 40, is a web or wall 41. The wall 41 is formed with a centrally positioned well 42 open to the opening 5 and closed by a relatively thin bottom wall portion 43 opposed to the opening 4. The web 41 includes a vertically extending, as the parts are shown, central segment 44 in which well 42 is formed. On opposite sides of the central segment 44, the web 41 has formed therein a pair of semicircular recesses 45, 46. The recesses 45, 46 are of a depth such as to create the relatively thin bottom walls thereof indicated in dotted lines at 47. Thus the recesses provide punchout sections 45a,46a.

Figure 2:
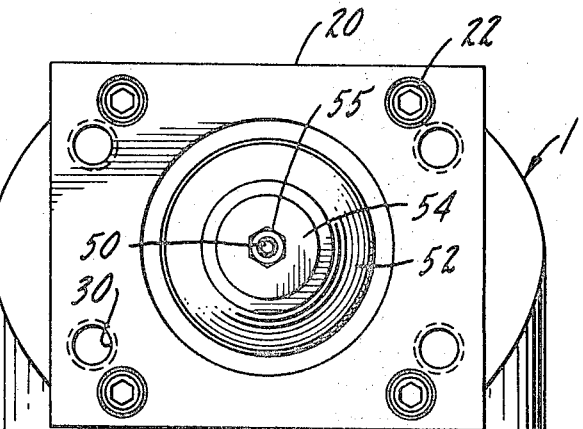
FIG. 2 is an end view as viewed on the line 2—2 of FIG. 1.

In the form illustrated in FIGS. 1 and 2, the closure bottom wall of well 42 has been punched out, as have the punchout segments 45a,46a. A rod 50 has been positioned in and extends through the wall 42, having a head 51 engaging the surface of support 44 opposed to inlet 4. A valve member 52 is slidable on rod 50 to engage the opposite surface of wall 41 and thus to close the openings created by removal of the punchouts 45a,46a. A yielding structure, such as the springs 53, engages the valve 52 to urge the same against the wall 41, the springs 53 being retained by retainer 54 held against the action of springs 53 by nut 55 threaded onto the distal end of rod 50.

The use and operation of the invention are as follows:

A large number of filter housing heads may be easily and conveniently formed in the manner illustrated in FIG. 7. The structure and design of the head 1 shown in FIG. 7 may, for example, be conveniently cast. Thereafter the heads 1 may be sorted and inventoried in quantity as a standard, substantially universal head element.

Upon receipt of orders for filter heads having bypass valves, the relatively thin wall segments 43 and 47 are easily punched out or removed and the bypass valve elements 50—55 installed. Orders for filter heads not requiring a bypass feature are filled with the heads 1 as shown in FIG. 7.

Similarly, the heads of FIG. 7, with or without the bypass valve elements as above described, may be supplied in response to orders involving installation of the filter structure with a wide variety of piping, threaded or flanged tubing and the like. As specified by the customer, a suitable pair of connection-forming or conversion members 20 are supplied with each of the heads 1. Thus a comparatively large number of the simple block members 20 having varying diameter and conformed bores therethrough are maintained in conjunction with a supply of the heads 1 as shown in FIG. 7. Thus it becomes unnecessary to manufacture, inventory and store a large number of filter heads incorporating varying integral connection elements of varying bore sizes and thread or flange configurations.

With the openings 4,5 maintained at maximum diameter for the filter head size involved, the piping connected at inlet 4 will have a diameter equal to or less than that of opening 4. Similarly, the bypass valve passage will be of maximum diameter and fully capable of handling any flow through such piping. When the piping diameter is less than that of opening 4, a greater volume of more viscous fluid arriving in cold or start-up conditions may be received without effect upon the bypass valve mechanism. Flanged or otherwise configured tubing or piping arranged for use with a connector fitting of the type shown in FIG. 6, for example, may be easily employed. The form of FIG. 6 is not easily castable integrally with a filter and, if formed integrally with a filter head, would not permit of use with a flanged tubing. The filter head of the invention is thus a universal head, usable with a variety of fitting elements of differing sizes and configurations.

I claim:

1. A universal filter head structure including a filter head having a pair of external, flat pad surfaces within the maximum diameter of said head, an axial opening in each of said pad surfaces, a chamber within said head and communicating with said openings, and a set of four threaded sockets radially disposed about each said opening in each of said surfaces and arranged in a square;

connection adapter plates having an axial passage, a set of four apertures radially disposed about said passage and arranged in a square corresponding to that in which said sockets are arranged, whereby said apertures and sockets are alignable, and a set of threaded sockets radially disposed about said passage and arranged in an elongated rectangle, said apertures and last-named sockets being in an interference-free relationship, whereby said plates are selectively securable to said surfaces in at least two alternative positions by fastening means inserted through said apertures and into said first-named sockets;

a groove surrounding each of said axial openings and a seal seated in said groove and retained therein by one of said plates; and a wall formed integrally with said head and dividing said chamber and recesses formed in said wall and defining knockout segments for selective reception of bypass valve elements.